United States Patent
Shah et al.

(10) Patent No.: US 12,493,655 B1
(45) Date of Patent: Dec. 9, 2025

(54) CLUSTERING DATABASE ITEMS BASED ON OUTPUT OF MACHINE-LEARNING MODEL TO LINK DATABASE ITEMS THAT REPRESENT THE SAME CORE ITEM BUT WITH A DIFFERENT STORED SIZE OR FORM ATTRIBUTE

(71) Applicant: Maplebear Inc., San Francisco, CA (US)

(72) Inventors: Naval Shah, Toronto (CA); Charles Wesley, San Diego, CA (US); Brent Scheibelhut, Toronto (CA); Mark Oberemk, Toronto (CA)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/951,389

(22) Filed: Nov. 18, 2024

(51) Int. Cl.
*G06F 16/906* (2019.01)
*G06F 16/9538* (2019.01)

(52) U.S. Cl.
CPC ........ *G06F 16/906* (2019.01); *G06F 16/9538* (2019.01)

(58) Field of Classification Search
CPC ............................ G06F 16/906; G06F 16/9538
See application file for complete search history.

(56) References Cited

U.S. PATENT DOCUMENTS

| | | | | |
|---|---|---|---|---|
| 11,934,411 | B1 * | 3/2024 | Murarka | G06Q 30/0625 |
| 12,106,351 | B1 * | 10/2024 | Verma | G06F 18/2431 |
| 2018/0268082 | A1 * | 9/2018 | Latzina | G06F 16/287 |
| 2024/0386462 | A1 * | 11/2024 | Qi | G06Q 30/0255 |
| 2025/0124484 | A1 * | 4/2025 | Mesard | G06F 40/40 |
| 2025/0156925 | A1 * | 5/2025 | Luna | G06Q 30/0631 |
| 2025/0200115 | A1 * | 6/2025 | Chalkley | G06F 16/9538 |

* cited by examiner

*Primary Examiner* — Jared M Bibbee
(74) *Attorney, Agent, or Firm* — Fenwick & West LLP

(57) ABSTRACT

A trained machine-learning model is used to group items in a database of an online system that represent a same core item (i.e., product) but of different attributes. The online system applies, for pairs of items from a specific chunk of the database, the machine-learning model to metadata for each pair of items and category data for each pair of items to generate a clustering score for each pair of items that indicates a likelihood that both items belong to a cluster of items that identifies the core item. The online system then requests a language model to generate a response including a list of attributes in a structured form for each item from the cluster. The online system stores, in an entry of the database associated with each item from the cluster, the list of attributes in the structured form and an identification of the cluster.

20 Claims, 5 Drawing Sheets

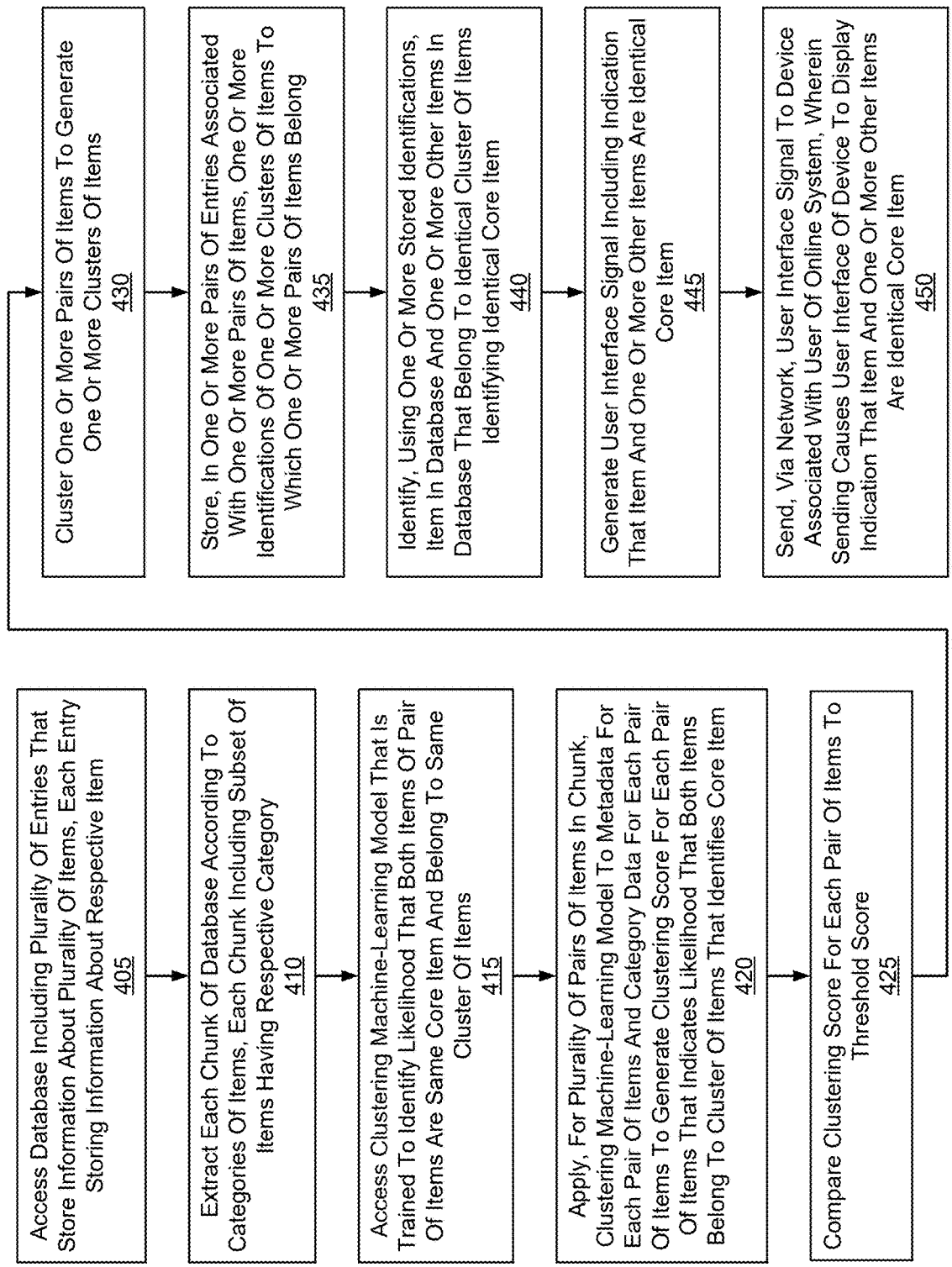

CLUSTERING DATABASE ITEMS BASED ON OUTPUT OF MACHINE-LEARNING MODEL TO LINK DATABASE ITEMS THAT REPRESENT THE SAME CORE ITEM BUT WITH A DIFFERENT STORED SIZE OR FORM ATTRIBUTE

BACKGROUND

An online system can be used for placing online orders so that users of the online system can perform online purchases of various products (e.g., groceries) offered by sources (e.g., retailers). A database of the online system (e.g., item catalog) includes many products that are identical but for the size or form factor (e.g., soda 1 L, soda 0.5 L, soda 6-pack, etc.). These products exist as separate items in the database, so they may come up as different products in the search results. The product data that are stored in the database sometimes might not be represented in a hierarchical or structured way. Instead, the product data may include information about products that are stored in a flat hierarchy where relationships between similar products do not exist, and it may be too complicated and too technically cumbersome to deduce the product relationships using stored product data. Therefore, there is a technical problem of how to group items in the database that represent a same product but of different attributes (e.g., size, form factor, and/or quantity).

SUMMARY

Embodiments of the present disclosure are directed to clustering database items according to an output of a trained machine-learning model of an online system to link database items that represent a same core item (i.e., same product) but with a different stored attribute (e.g., size attribute, form attribute, etc.).

In accordance with one or more aspects of the disclosure, the online system accesses a database of the online system, the database including a plurality of entries that store information about a plurality of items, each entry of the plurality of entries storing information about a respective item of the plurality of items. The online system extracts each chunk of a plurality of chunks of the database according to a plurality of categories of the plurality of items, each chunk including a subset of the plurality of items having a respective category of the plurality of categories. The online system accesses a clustering machine-learning model of the online system, wherein the clustering machine-learning model is trained to identify a likelihood that both items of a pair of items are a same core item having one or more different attributes and belong to a same cluster of items that identifies the same core item. The online system applies, for a plurality of pairs of items in that chunk of the database, the clustering machine-learning model to metadata for each pair of items of the plurality of pairs and category data for each pair of items of the plurality of pairs to generate a clustering score for each pair of items of the plurality of pairs that indicates the likelihood that both items in each pair of items of the plurality of pairs belong to a cluster of items that identifies a core item. The online system compares the clustering score for each pair of items to a threshold score. Responsive to one or more clustering scores for one or more pairs of items of the plurality of pairs being above the threshold score, the online system clusters the one or more pairs of items to generate one or more clusters of items. The online system stores, in one or more pairs of entries of the plurality of entries associated with the one or more pairs of items, one or more identifications of the one or more clusters of items to which the one or more pairs of items belong. The online system identifies, using the one or more stored identifications, an item in the database and one or more other items in the database that belong to an identical cluster of items of the one or more clusters identifying an identical core item. The online system generates a user interface signal including an indication that the item and the one or more other items are the identical core item. The online system sends, via a network, the user interface signal to a device associated with a user of the online system, wherein the sending causes a user interface of the device to display the indication that the item and the one or more other items are the identical core item.

BRIEF DESCRIPTION OF THE DRAWINGS

FIG. 4 is a flowchart for a method of clustering database items according to an output of a trained machine-learning model of an online system to link database items that represent a same core item (i.e., same product) but with a different stored attribute, in accordance with one or more embodiments.

DETAILED DESCRIPTION

Figure 1A:
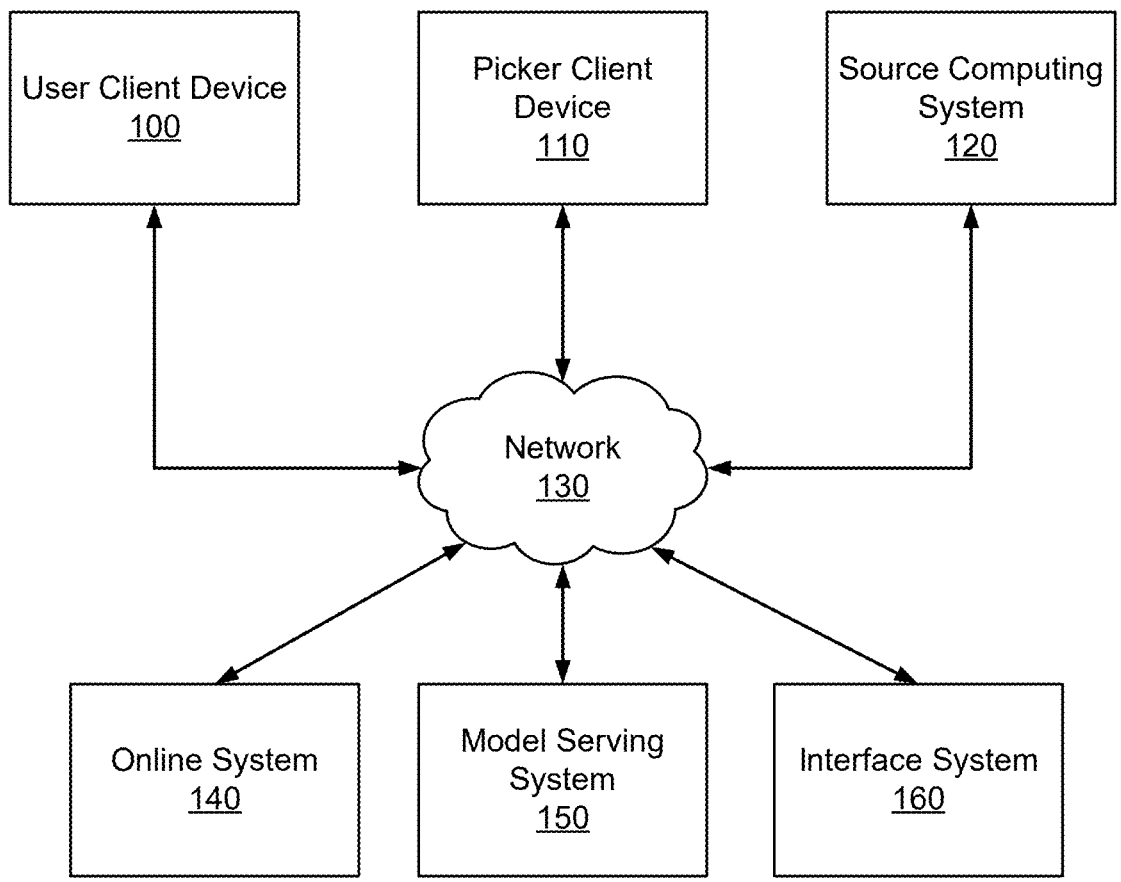
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a user client device 100, a picker client device 110, a source computing system 120, a network 130, an online system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1A, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system 140 and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140.

The online system 140 allows users to acquire items that represent an identical core item (or product) but having one or more different attributes, such as sizes and/or form factors. Multiple items can be of a same core item when the items represent a same product but for a size or form factor attribute. For example, 1 L bottle of Brand A Soda, 6-pack of Brand A Soda, 12-pack of Brand A Soda, and 1 L carton pack of Brand A Soda are items of the same core item "Brand A Soda" but of different attributes (e.g., sizes and form factors). In another example, a 375 mL bottle of Brand B Ketchup and a 750 mL bottle of Brand B Ketchup are items of the same core item "Brand B Ketchup" but of a different size attribute.

The items that represent an identical core item are stored as separate and unrelated items in an item database of the online system 140. To facilitate applications that link the items from the item database (e.g., a page for the product type enabling a user of the online system 140 to select different sizes or form factors of the same product), the online system 140 runs a batching algorithm that links these items. The batching algorithm involves two sequenced multi-modal machine-learning model stages presented herein.

In the first stage, the online system 140 identifies identical core items (or products) in the item database, i.e., groups of items that belong to same products but in different form factors, sizes, and/or quantities. To achieve this, the online system 140 clusters the items by dividing the item database (e.g., by a core item taxonomy) and deploys a trained clustering machine-learning model on pairs of items. In the second stage, once the items are grouped (i.e., clustered), the online system 140 may utilize a large language model (LLM) to extract the attribute information (e.g., size, form factor, quantity, etc.) from the item database records for each item in a structured form, for use by the online system 140 in various applications.

The online system 140 may group items that are identical core items (or products) but with different attributes (e.g., size, form factor, quantity, etc.), so these items of different attributes can be presented together when one of the items in the group are shown in a user interface of the online system 140, e.g., in search results. For example, when a user of the online system 140 clicks into a page for any item in the group, a user interface of the user client device 100 may show all of the items from the group in the product page.

Hence, the problem being solved herein is that items representing identical core items that are offered in multiple sizes, form factors, quantities, etc. (e.g., the same potato chips offered in both snack size and family size) show up as distinct core items (i.e., products) in a user interface of the online system 140. Users of the online system 140 searching for one product have to spend time searching to find the right size, and if that particular size is out of stock, it is hard and time consuming to deduce that there is a different size in stock without finding that other product separately. The solution presented herein is to store, in the item database, a grouping of identical core items (i.e., products) that only vary in one or more attributes (e.g., size, form factor, quantity, etc.) and augment the user interface of the online system 140 with those details so that users of the online system 140 can see all of their options for the same product in one place (e.g., on a single page of a user interface).

The model serving system 150 receives requests from the online system 140 to perform tasks using machine-learning models. The tasks include, but are not limited to, natural language processing (NLP) tasks, audio processing tasks, image processing tasks, video processing tasks, and the like. In one or more embodiments, the machine-learning models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learning model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM, the LLM is able to perform various tasks and synthesize and formulate output responses based on information extracted from the training data.

In one or more embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The online system 140 may employ an LLM of the model serving system 150 to extract specific attributes of items stored in the item database (e.g., size, form factor, quantity, etc.) in a structured form. The online system 140 may prepare (e.g., via a prompt generation module 260 in FIG. 2) a prompt for input to the LLM. The prompt may include descriptive information and metadata (e.g., images) for different items that are previously identified to belong to a same core item (i.e., same product).

The LLM may generate a response to the prompt based on execution of the machine-learning model using the prompt. The response may include information about attributes of items (e.g., size, form factor, quantity, etc.) in a structured form. The online system 140 may import the response from the model serving system 150 and use the response to generate a user interface of the user client device 100, a user interface of the picker client device 110, a user interface of the source computing system 120, or some other applications. Example prompts input to the LLM, and examples responses generated by the LLM are provided below.

Prompt to the LLM: "If I give you two different product images, say, for an item from a grocery store, I'd like you to tell me whether it's the same product in a different size, or two different products altogether. Can you do that for me?"

Response from the LLM: "Yes, I can help with that. Please provide the images of the products you'd like me to compare."

Prompt to the LLM: <Images of two products are input into the LLM.>

Response from the LLM: "Based on the images you provided, it appears that both products are <Brand A> Ketchup, but in different sizes. The first image shows a 375 mL bottle, while the second image shows a 750 mL bottle. Therefore, they are the same product in different sizes."

Prompt to the LLM: "That's great. If I give you two more products to compare in the same manner, but also, I'd like to understand if the type of container (bottle, can, bag) is different as well. For example, maybe one product is both a different size but also in a different type of container. We still want to make sure it's the same product."

Response from the LLM: "Sure, I can help with that. Please provide the next two product images you'd like me to compare, and I'll check for both size and type of container."

Prompt to the LLM: <Images of two products in different types of containers are input into the LLM.>

Response from the LLM: "Based on the images provided, here are the comparisons: The first image is a 335 mL can of <Brand B> soda. The second image is a 1 L bottle of <Brand B> soda. They are the same product (<Brand B> Original Taste Soda) but in different sizes and different types of containers. The first one is in a can, and the second one is in a plastic bottle."

Prompt to the LLM: "Can you tell me what the materials are for each of those? For example, plastic for bottle, and aluminum for the can."

Response from the LLM: "Certainly! The materials for each product are: The first product is a 335 mL can of <Brand B> soda, which is made of aluminum. The second product is a 1 L bottle of <Brand B> soda, which is made of plastic (specifically PET, or polyethylene terephthalate)."

In one or more embodiments, the task for the model serving system 150 is based on knowledge of the online system 140 that is fed to the machine-learning model of the model serving system 150, rather than relying on general knowledge encoded in the model weights of the model. Thus, one objective may be to perform various types of queries on the external data in order to perform any task that the machine-learning model of the model serving system 150 could perform. For example, the task may be to perform question-answering, text summarization, text generation, and the like based on information contained in an external dataset.

Thus, in one or more embodiments, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online system 140 can generate a prompt using the external data as context, often times, the amount of information in the external data exceeds prompt size limitations configured by the machine-learning language model. The interface system 160 can resolve prompt size limitations by generating a structured index of the data and offers data connectors to external data sources.

Figure 1B:
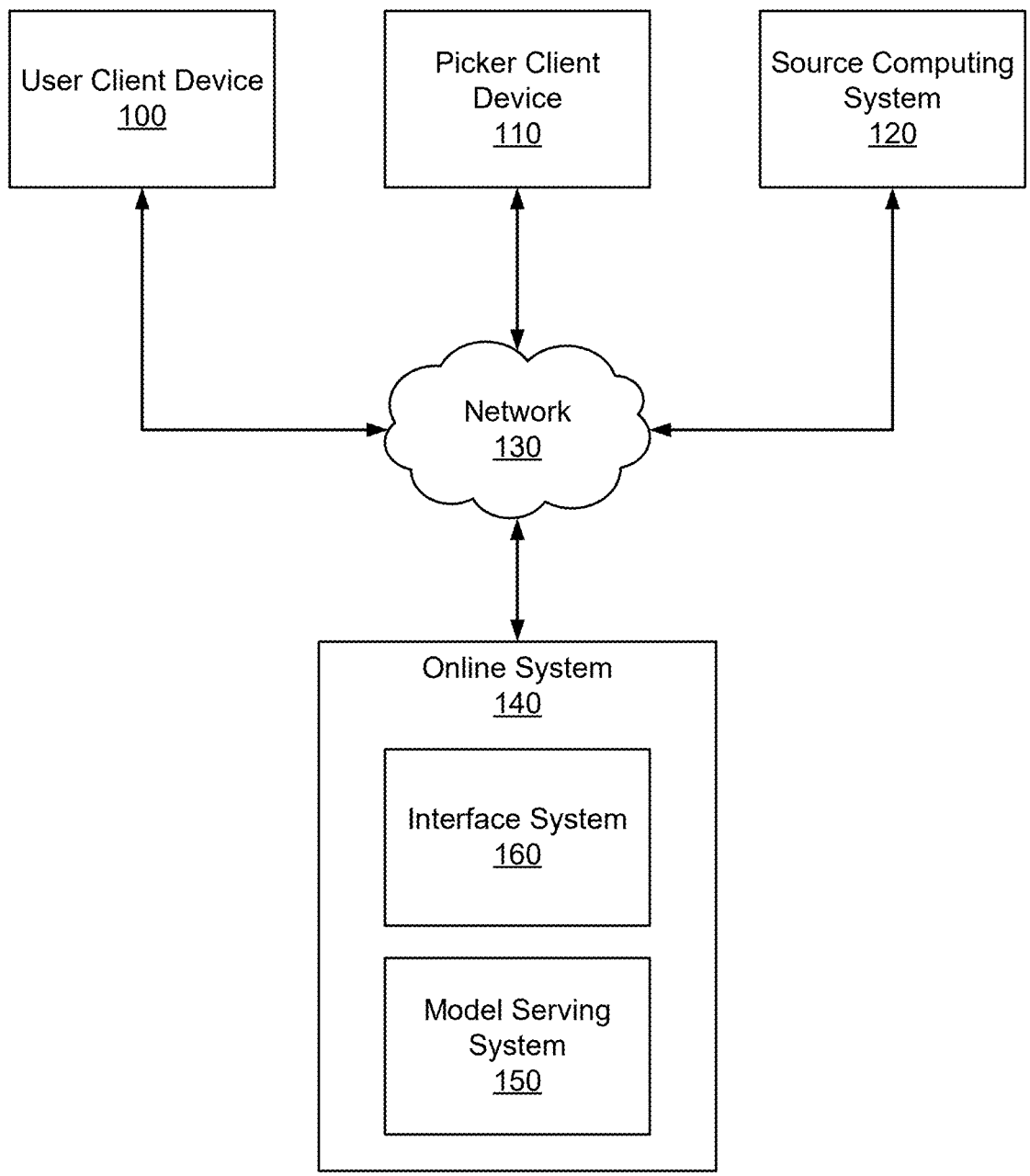
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a user client device 100, a picker client device 110, a source computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online system 140. In one or more embodiments, as illustrated in the example system environment in FIG. 1B, the model serving system 150 and/or the interface system 160 is managed and deployed by the entity managing the online system 140. The online system 140 is described in further detail below with regards to FIG. 2.

Figure 2:
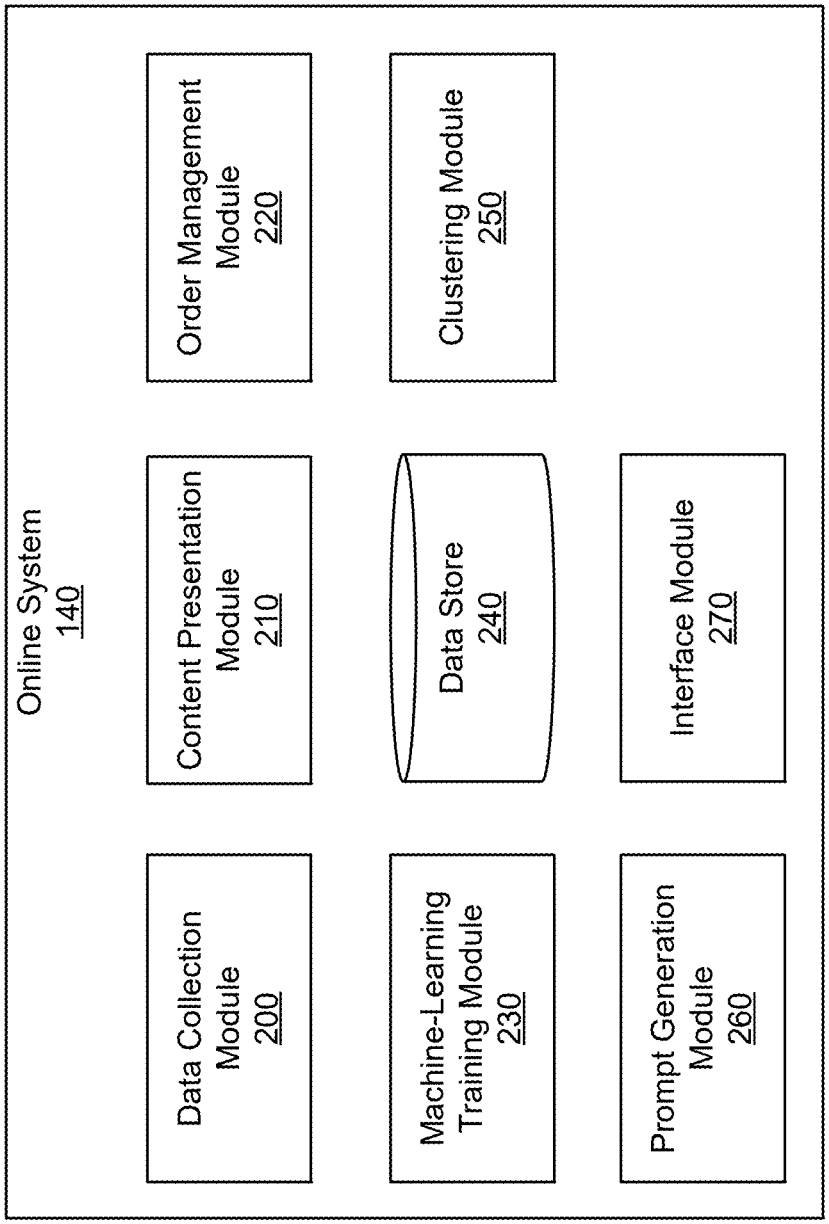
FIG. 2 illustrates an example system architecture for an online system, in accordance with one or more embodiments.

FIG. 2 illustrates an example system architecture for the online system 140, in accordance with some embodiments.

The system architecture illustrated in FIG. 2 includes a data collection module 200, a content presentation module 210, an order management module 220, a machine-learning training module 230, a data store 240, a clustering module 250, a prompt generation module 260, and an interface module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In one or more embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In one or more embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In one or more embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learning models hosted by the model serving system 150, the machine-learning models may already be trained by a separate entity from the entity responsible for the online system 140. In one or more other embodiments, when the model serving system 150 is included in the online system 140, the machine-learning training module 230 may further train parameters of the machine-learning model based on data specific to the online system 140 stored in the data store 240. As an example, the machine-learning training module 230 may obtain a pre-trained transformer language model and further fine tune the parameters of the transformer language model using training data stored in the data store 240. The machine-learning training module 230 may provide the transformer language model to the model serving system 150 for deployment.

The clustering module 250 may cluster (or group) items stored in an item database (e.g., at the data store 240). To group the items, the clustering module 250 may perform a pairwise comparison of items to determine whether they belong to the same product (i.e., the same core item) but of different attributes (e.g., size, form factor, quantity, etc.). The goal is to cluster items into groups (or clusters), such that each group of items in the item database represents a group that defines a respective product (or core item). Hence, the clustering module 250 may be configured to define the groups of items programmatically, as well as to group the items stored in the item database. To avoid having to run the pairwise comparison for every possible pair of times in the very large item database in the data store 240, the clustering module 250 may first divide the item database into smaller chunks. The clustering module 250 may divide the item database into smaller chunks by using taxonomic data, replacements data, other metadata (e.g., information about brands of items), etc.

Once the clustering module 250 divides the item database into smaller chunks, the clustering module 250 may access a clustering model (e.g., machine-learning model) that is trained to identify, for each pair of items in a chunk of the item database, whether items from that pair belongs to a same cluster (or group) of items. More specifically, the clustering model may be trained to identify a likelihood that a pair of items are the same product (or core item), but of different attributes (e.g., size, form factor, and/or quantity). The clustering module 250 may deploy the clustering model to run a machine-learning algorithm to output, based on input signals, a clustering score for a pair of items that indicates a likelihood that the pair of items are the same product, but of different attributes. The clustering score may be a value between 0 and 1, where a higher value of the clustering score may indicate a higher likelihood that the pair of items are the same product, and a lower value of the clustering score may indicate a lower likelihood that the pair of items are the same product. A set of parameters for the clustering model may be stored at one or more non-transitory computer-readable media of the clustering module 250. Alternatively, the set of parameters for the clustering model may be stored at one or more non-transitory computer-readable media of the data store 240.

In providing the input signal to the clustering model, the clustering module 250 may provide replacements data, item metadata (e.g., images of items and products, descriptions of items and products, etc.), taxonomy node information for items (e.g., information about classifications of items, information about categories or types of items, etc.), some other data that can be used to identify whether a pair of items from the item database represent a same product (or core item) and thus belong to a same cluster (or group) of items, or some combination thereof. Since the clustering model receives both textual data and images as the input signals, the clustering model may be configured as a multimodal machine-learning model. The clustering module 250 may retrieve the input signals from the item database and, optionally, a user database (e.g., also stored at the data store 240).

In providing the replacements data to the clustering model, the clustering module 250 may provide information about historical replacements of items conducted over time by a collection of users of the online system 140, such as, when an originally requested item is unavailable (e.g., out-of-stock) and a user of the online system 140 selects a replacement item. The selected replacement item may be a same product as the originally requested item, but of different size, form factor, and/or quantity. Hence, the specific replacement data may help raise a confidence that two items being compared by the clustering model are indeed the same product. The clustering module 250 may retrieve the replacements data from the user database (e.g., at the data store 240).

In providing the item metadata to the clustering model, the clustering module 250 may provide image data for a pair of items being compared by the clustering model, product descriptions for the pair of items, some other data related to the pair of items, or some combination thereof. The clustering module 250 may retrieve the image data from the item database (e.g., at the data store 240). Images of different items that represent identical products are sometimes very similar. For example, for a same type and brand of yogurt that is available in different sizes, their images are often identical apart from a quantity and/or size indicator on the container. Also, marketing images are often the same for identical products. The image data input to the clustering model may further include nutritional data image tables for the pair of items. Note that the nutritional data image tables may be unchanged for the pair of items if these two items are a same product.

In providing the product descriptions for the pair of items to the clustering model, the clustering module 250 may provide a list of ingredients for each item in the pair, a text that is displayed as part of a product detail page (PDP) for each item in the pair, some other information about the pair of items, or some combination thereof. The clustering module 250 may retrieve the product descriptions from the item database (e.g., at the data store 240).

In providing the taxonomy node information to the clustering model, the clustering module 250 may provide information about to which taxonomy node (e.g., class, category, type, etc.) each item from the pair of items belongs, or some other information related to classification of each item from the pair of items. The clustering module 250 may retrieve the taxonomy node information from the item database (e.g., at the data store 240).

An output of the clustering model may be clusters (or groups) of items, where each cluster is composed of items representing an identical product (or core item) but of different attributes (e.g., varying size, form factor, and/or quantity). The online system 140 may feed the output of the clustering model to an LLM of the model serving system 150, e.g., via the prompt generation module 260.

The machine-learning training module 230 may perform initial training of the clustering model using training data. The machine-learning training module 230 may generate the training data by labeling (e.g., by applying the Mechanical Turk style) items in the item database to achieve initial clustering of items. The machine-learning training module 230 may train the clustering model using the training data to generate initial values for the set of parameters of the clustering model.

The machine-learning training module 230 may collect feedback data with information about whether items that were clustered as an identical core item (or product) are indeed a same core item. The online system 140 may use outputs of the clustering model to augment PDPs of corresponding items or user interfaces of, e.g., the user client devices 100, the picker client devices 110 and/or the source computing systems 120 to gather feedback from users, pickers, sources, and/or CPG (consumer packaged goods) entities about whether items that were clustered as an identical core item are indeed a same core item. Alternatively or additionally, the online system 140 may generate user interfaces with prompts for users of the online system 140 and/or pickers associated with the online system 140 to provide feedback on whether items that were clustered as an identical product are indeed a same product. An example prompt may be: "Not the same product? Click here to report." The goal is to collect the feedback data with information about pairs of items that were clustered by the clustering model as the same core items are actually not the same core items (e.g., negative reinforcement). Similarly, the online system 140 may collect the feedback data from user activity that implies that the clustering model was indeed correct about how items from the item database had been clustered (e.g., positive reinforcement). The machine-learning training module 230 may then re-train the identifier matching model by updating the set of parameters of the identifier matching model using the feedback data.

The prompt generation module 260 may prompt an LLM (e.g., LLM of the model serving system 150) to extract the key varying attributes of items from a same group (e.g., size, form factor, and/or quantity) and output the extracted attributes in a structured format. The interface module 270 may then import the output from the LLM and then add extracted attributes in the structured format to the item database (e.g., at the data store 240). The attribute data stored in the structured form may be utilized (e.g., via the content presentation module 210 or the interface module 270) as, e.g., a part of selection options in a product page user interface of the online system 140.

The prompt generation module 260 may generate a prompt for input into the LLM. The prompt may be a set of inputs including both image data and textual information, i.e., the LLM may be configured as a multi-modal LLM. In providing the set of inputs to the LLM, the prompt generation module 260 may provide information about items in a cluster retrieved from the item database, such as a product description of each item in the cluster, and metadate (e.g., one or more images) for each item in the cluster. The prompt generation module 260 may further include a request into the prompt to ask the LLM to extract attribute data (e.g., size, form factor, and/or quantity) for each item in the cluster and output the extracted attribute data in the structured form.

Based on the prompt input to the LLM, the LLM may generate a response including a list of attributes (e.g., size, form factor, and/or quantity) for each item in the cluster in a structured format. In one or more embodiments, the response provided by the LLM includes two attributes for each item in the cluster in a structured format—a size of an item (e.g., 200 ml, 750 ml, 1 L, 500 ml, etc.) and a form factor (e.g., plastic bottles, aluminum cans, etc.). It should be noted that the size attribute may also include information about a quantity (e.g., 100 g×4 for a four-pack size).

The response provided by the LLM may be imported to the online system 140, e.g., via the interface module 270. The interface module 270 may store the response including the attribute data (e.g., size data, quantity data, and/or form factor data) in the structured form to the item database (e.g., at the data store 240). The attribute data in the structured form stored in the item database may be then leveraged and utilized in various use cases.

The interface module 270 may retrieve the structured attribute data stored in the item data for various applications. In one or more embodiments, when a user of the online system 140 enters a search query for a particular item via a user interface of the user client device 100, the interface module 270 retrieves structured attribute data for items in a corresponding cluster and use this information to generate a user interface signal for sending to the user client device 100. The user interface signal may then cause the user client device 100 to display the user interface with search results where a PDP of the searched-for item is augmented with all available attribute options (e.g., sizes, form factors, quantities, etc.) rather than providing these different attribute options as separate search results. Although the online system 140 may continue to surface all attribute options as distinct search results, each item PDP may show other available attribute options (e.g., other size and form factor options).

In one or more embodiments, such as for cases where both the original attribute option (e.g., original size) and new attribute option (e.g., new size) are available in a source location, the interface module 270 may generate a user interface signal that causes the user client device 100 to display the user interface with only one of these two available attribute options (e.g., to display only product details of a larger size item). In such cases, the interface module 270 may detect a case where a difference between attributes (e.g., item sizes) is within a small margin (e.g., below a threshold difference) and avoid displaying multiple very similar attribute options that can confuse the user.

In one or more embodiments, the interface module 270 utilizes the structured attribute data stored in the item database to enhance or improve search relevance in cases where some highly relevant items are unavailable (e.g., out of stock). In such cases, the interface module 270 may generate a user interface signal that causes a user interface of the user client device 100 to display seamlessly augmented search results with alternative attribute options (e.g., sizes and form factors). For example, if a user of the online system 140 is searching for a 500 ml carton of a particular brand and fat percentage of milk, which is out of stock, the interface module 270 may use the corresponding structured attribute data stored in the item database to generate a user interface signal that causes a user interface of the user client device 100 to augment the search results with an indication that, while the 500 ml item the user is looking for is out of stock, there is a 1 L carton of the same product available.

In one or more embodiments, for the purpose of Buy It Again (BIA) user experience, the interface module 270 utilizes the structured attribute data stored in the item database to generate a corresponding user interface signal for the user client device 100. For example, as products' attributes (e.g., form factor and size/quantity) change over time, or the usage of different materials evolves over time (e.g., plastic jug instead of carton), it is desirable for the online system 140 to continue displaying items that belong to the same products even if an exact attribute match is unavailable, due to being phased out, not in stock, or because a source associated with the online system no longer carries that specific attribute option (e.g., specific product size).

In one or more embodiments, when an item of a specific attribute option (e.g., size or form factor) was previously purchased by a user of the online system 140 but that same attribute option is no longer available (e.g., discontinued due to user demand or economic conditions, out of stock, etc.), the interface module 270 retrieves corresponding structured attribute data from the item database and generates a user interface signal that causes the user client device 100 to display a user interface showing product details of the identical core item (e.g., product) but of a different attribute option (e.g., different size or different form factor). For example, if the carton of milk that was previously purchased by user has changed into a plastic jug, the interface module 270 may retrieve corresponding structured attribute data from the item database and generate a user interface signal that causes the user client device 100 to display a user interface showing product details about the same milk product but of different form factor (e.g., plastic jug instead of carton). Similarly, when the originally purchased item still exists but is currently unavailable (e.g., out of stock), the interface module 270 may retrieve a corresponding structured attribute data from the item database and generate a user interface signal that causes the user client device 100 to display a user interface with information that the identical core item (e.g., identical product) of another attribute option (e.g., another size) is currently available in a source location even though the originally purchased item is out of stock.

In one or more embodiments, the online system 140 applies the clustering module and the LLM as presented herein to achieve an end-to-end flow for an efficient user's experience when a user of the online system 140 interacts with the online system 140. The user may utilize a user interface of the user client device 100 to select a source associated with the online system 140 and a location of the source. Then, the interface module 270 may fetch BIA items from the item database (e.g., at the data store 240) for rendering the user interface of the user client device 100 so that the user can start building a cart. In such cases, the interface module 270 may also retrieve structured attributed data from the item database that belong to items grouped in a corresponding cluster so that the user interface of the user client device 100 augment a PDP page of each BIA item with attribute options of other items that belong to the same cluster as that original BIA item. Before displaying an augmented PDP page of each original BIA item, the interface module 270 may filter the original BIA items for availability. For original BIA items that are not available, the interface module 270 may fetch, from the item database, other items of the same products with varying attributes (e.g., form factors and/or sizes), and render those as part of the augmented PDP page of the original BIA item with some special user experience treatment, so the user can see the difference between the original BIA item and other items that are the same core item (e.g., product) as the original BIA item but of different attributes.

The online system 140 that integrates the clustering model and the LLM for generating structured attribute data for the item database solves the problem of handling various attribute options (e.g., various sizes and form factors) by deducing and storing the groupings of identical core items (e.g., products) offered in different sizes and/or form factors so that the online system 140 can augment various parts of the user journey or CPG journey. In one or more embodiments, upon a request from a CPG entity associated with the online system 140, the interface module 270 provides structured attribute data from the item database for a given cluster of items that represent a same core item (e.g., same product). In this manner, the CPG entity may define an ad campaign for all attribute options (e.g., all sizes and form factors) of a product, without having to specify the specific items (e.g., specific sizes and form factors). The online system 140 may apply the clustering model and the LLM to continue to update a cluster of items in the item database as new attribute options (e.g., new sizes and form factors) become available, i.e., each cluster of items in the item database may evolve over time.

Hence, CPG entities that use the online system 140 for advertising and sponsoring products can utilize the clustering of items in the item database as a new atomic unit to target. The CPG entities may no longer have to individually manage each product attribute (e.g., size and/or form factor) differently. Instead, the CPG entities may manage ads on a cluster of items stored in the item database, thus making it easier to handle the case where some items of the same product are newly introduced, and some other items of the same product are gradually phased out. The CPG entities may start to treat the clusters of items as atoms or prototypical units for select of a target product for advertising and/or sponsoring. For example, a CPG entity may be allowed to target or advertise a whole cluster of items in the item database, so that when one or more attributes (e.g., size and/or form factor) of an identical product change, the CPG entity may not need to specify a new product for advertising and/or sponsoring purposes.

In one or more embodiments, the online system 140 applies the clustering module and the LLM as presented herein to achieve an end-to-end flow for an efficient CPG experience when an CPG entity interacts with the online system 140. The CPG entity may first log into an ads manager of the online system 140. As the CPG entity sets up a new campaign, the CPG entity may choose a budget and campaign type (e.g., advertisement, sponsorship, etc.). After that, the CPG entity may need to select products as part of campaign groups. By having access to clustered items with structured attribute data stored in the item database, the CPG entity may select all the items in a cluster of items at once as these items represent a same core item (e.g., same product) but of different attributes (e.g., different sizes and/or form factors). The online system 140 may apply the clustering module and the LLM to automatically keep the list of items in the cluster (e.g., list of items that represent variations of the same product) up to date as items with new attribute options appear and items with old attribute options get discontinued over time. This has a net benefit for CPG entities as the CPG entities may only need to manage a cluster of items at a time, instead of separately managing each individual item that has a unique set of attributes. Hence, the online system 140 presented herein allows the CPG entities to avoid heavy administrative overheads and lost revenues.

In one or more embodiments, the interface module 270 retrieves a cluster of items with structured attribute data from the item database as part of a replacement algorithm applied at the online system 140. In such cases, the interface module 270 may provide the cluster of items as inputs to the replacement algorithm. Then, a user interface of the user client device 100 and/or a user interface of the picker client device 110 may show, when a specific requested item is unavailable, a set of items of different attribute options (e.g., different sizes and/or form factors) for selection by the user and/or the picker, where the set of items represent an identical core item (e.g., identical product) as the originally requested item but of different attributes.

Figure 3:
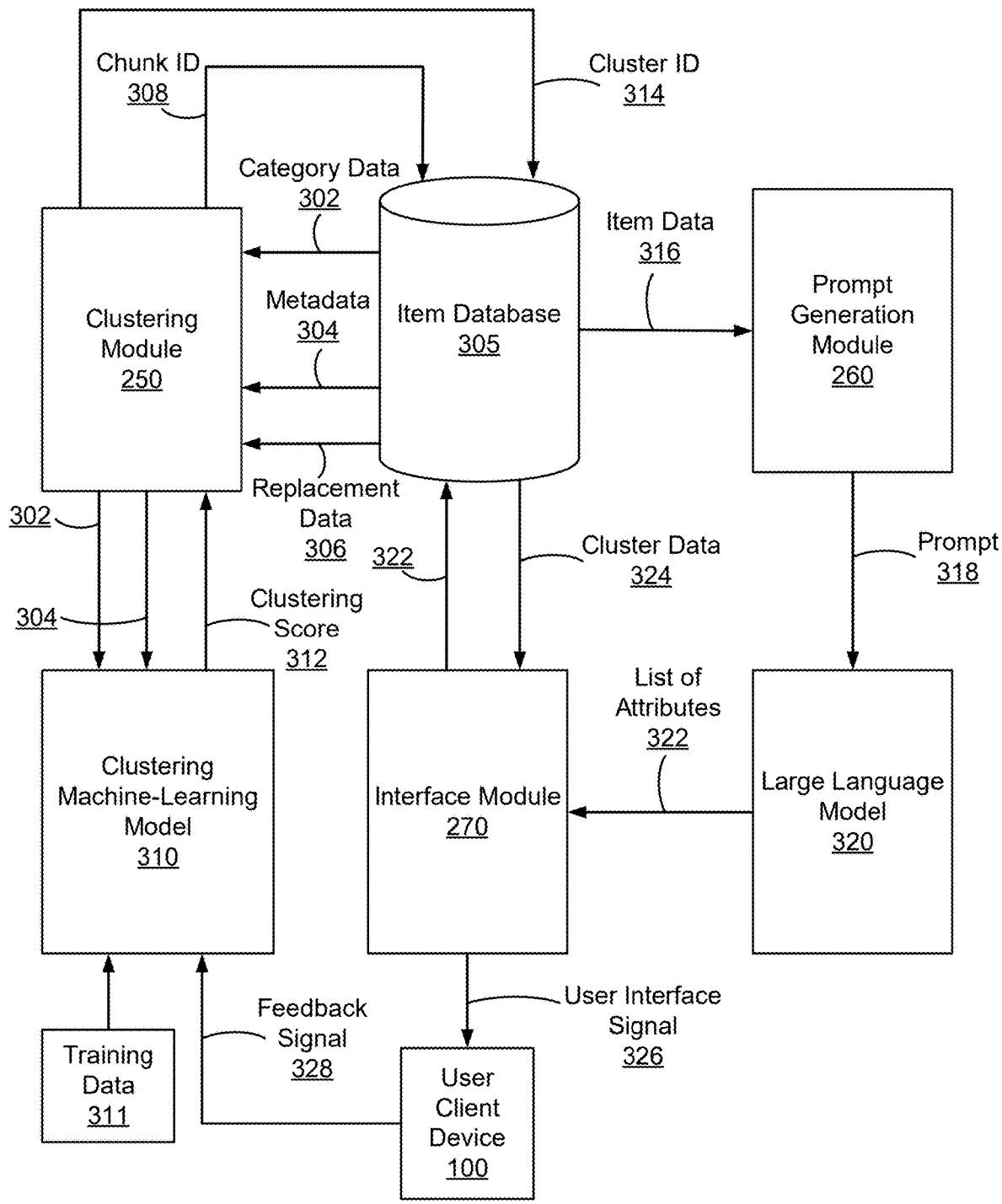
FIG. 3 illustrates an example architectural flow diagram of clustering database items according to an output of a trained machine-learning model of an online system to link database items that represent a same core item (i.e., same product) but with a different stored attribute, in accordance with one or more embodiments.

FIG. 3 illustrates an example architectural flow diagram 300 of clustering database items according to an output of a trained clustering machine-learning model 310 of the online system 140 to link database items that represent a same core item (i.e., same product) but with a different stored attribute (e.g., size attribute, form attribute, quantity attribute, etc.), in accordance with one or more embodiments. The clustering module 250 may first access the item database 305 and retrieve category data 302 for a collection of items, metadata 304 for the collection of items, and/or the replacement data 306 for the collection of items. The category data 302 may include information about a category (e.g., classification, type, taxonomy node, etc.) for each item of the collection of items. The metadata 304 may include image data (e.g., one or more images) for each item of the collection of items. The replacement data 306 may include information about a set of items selected over time by a collection of users of the online system 140 for replacing a corresponding item of the collection of items.

The clustering module 250 may utilize the category data 302 and/or the replacement data 306 to divide the item database 305 into chunks, where each chunk of the item database 305 include a subset of similar items, such as items of the same type or items that are within a threshold distance in a taxonomy tree. Each chunk of the item database 305 may be identified by a chunk ID 308. The clustering module 250 may generate a chunk ID 308 for each item of the collection of items and label with a corresponding chunk ID 308 a corresponding entry of the item database 305 that is associated with each item. In this manner, a memory space (e.g., collection of entries) of the item database 305 is effectively divided into memory sub-spaces or chunks. Additionally, the clustering module 250 map pass the category data 302 and/or the metadata 304 as input features to the clustering machine-learning model 310.

Prior to running a machine-learning algorithm of the clustering machine-learning model 310, the online system 140 may perform (e.g., via the machine-learning training module 230) initial training of the clustering machine-learning model 310 using training data 311 to generate initial values for a set of parameters of the clustering machine-learning model 310. The training data 311 may be generated (e.g., via the machine-learning training module 230) by collecting labels of items in the item database 305, where each label identifies a specific initial cluster for a corresponding item. The initial labeling (i.e., initial clustering of items in the item database 305) may be performed based on item categories and their historic replacement data.

The clustering machine-learning model 310 may apply, for each pair of items that belong to a same chunk of the item database 305 (e.g., identified by the same chunk ID 308) the machine-learning algorithm to category data 302 and/or the metadata 304 to generate a clustering score 312 for each pair of items that indicates a likelihood that both items in each pair of items belong to a cluster of items that identifies a core item (i.e., product). The clustering score 312 may be a value between 0 and 1, where a lower value of the clustering score 312 indicates a lower likelihood that both items in the pair of items belong to a same cluster of items, and a higher value of the clustering score 312 indicates a higher likelihood that both items in the pair of items belong to a same cluster of items. The clustering machine-learning model 310 may pass the clustering score 312 for each pair of items in the chunk of the item database 305 to the clustering module 250.

The clustering module 250 may compare the clustering score 312 for each pair of items in the chunk of the item database 305 to a threshold score. Responsive to the clustering score 312 being above the threshold score, the clustering module 250 may store, in a pair of entries of the item database 305 associated with that pair of items, a cluster ID 314 that represents an identification of a cluster of items to which both items in that pair of items belong, i.e., an identification of a core item (or product). After this process is performed for each pair of items of each chunk of the item database 305, the item database 305 includes the collection of items grouped into separate clusters, where each cluster identifies a respective core item (or product) to which all items in that cluster belong.

After the clustering of items in the item database 305 is achieved, the prompt generation module 260 may access the item database 305 and retrieve item data 316. The item data 316 may include information about each item from a cluster of items (e.g., product description for each item from the cluster) and/or metadata for each item from the cluster (e.g., one or more images of each item from the cluster). The prompt generation module 260 may generate a prompt 318 for input into a LLM 320 (e.g., LLM of the model serving system 150), where the prompt 318 includes the item data 316 and a request for generating a response including a list of attributes 322 (e.g., size, quantity, form factor, etc.) in a structured form for each item from the cluster.

Based on the prompt 318 input into the LLM 320, the LLM 320 may generate a response including the list of attributes 322 in the structured form for each item from the cluster. The interface module 270 may import the response generated by the LLM 320 including the list of attributes 322 in the structured form for each item from the cluster. Then, the interface module 270 may access the item database 305 and store, in a corresponding entry of the item database 305 that is associated with each item from the cluster, the list of attributes 322 in the structured form.

When a user of the online system 140 searches for or otherwise interacts with (or interacted in the past), via a user interface of the user client device 100, a specific item that belongs to a particular cluster of items identified by the cluster ID 314, the interface module 270 may access the item database 305 and retrieve cluster data 324 including the list of attributes 322 for each item from the cluster identified by the cluster ID 314 and descriptive information (e.g., product information) for each item from the cluster. Based on the cluster data 324, the interface module 270 may generate a user interface signal 326 with information from the cluster data 324. The interface module 270 may send, via the network 130, the user interface signal 326 to the user client device 100. The user interface signal 326 may then cause the user client device 100 to display the user interface with a page that includes the descriptive information and the list of attributes 322 for each item from the cluster.

The user client device 100 may record a feedback signal 328 including information provided by the user via the user interface of the user client device 100 about whether one or more items displayed on the page represent the core item (e.g., the same product) identified by the cluster of items. For example, the user may respond to a prompt displayed at the user interface to confirm that each item on the page actually represents the same core item. In such cases, a negative user's response about any item displayed on the page may represent a negative reinforcement indicated by the feedback signal 328, whereas a positive user's response about any item displayed on the page may represent a positive reinforcement indicated by the feedback signal 328. The online system 140 may receive (e.g., via the machine-learning training module 230) the feedback signal 328 from the user client device 100 via the network 130. The machine-learning training module 230 may utilize the feedback signal 328 to re-train the clustering machine-learning model 310. By utilizing feedback signals 328 provided over time by various users of the online system 140, the machine-learning training module 230 may continuously update the set of parameters of the clustering machine-learning model 310 and continuously improve the machine-learning algorithm of the clustering machine-learning model 310.

FIG. 4 is a flowchart for a method of clustering database items according to an output of a trained machine-learning model of an online system to link database items that represent a same core item (i.e., same product) but with a different stored attribute (e.g., size attribute, form attribute, quantity attribute, etc.), in accordance with one or more embodiments. Alternative embodiments may include more, fewer, or different steps from those illustrated in FIG. 4, and the steps may be performed in a different order from that illustrated in FIG. 4. These steps may be performed by an online system (e.g., the online system 140). Additionally, each of these steps may be performed automatically by the online system without human intervention.

The online system 140 accesses 405 (e.g., via the clustering module 250 or the interface module 270) a database of the online system 140 (e.g., an item database of the data store 240), the database including a plurality of entries that store information about a plurality of items, each entry of the plurality of entries storing information about a respective item of the plurality of items. An entry of the database may represent a memory space for storing data related to a corresponding item, including descriptive information (e.g., product description) about the item and metadata of the item (e.g., one or more images of the item).

The online system 140 extracts 410 (e.g., via the clustering module 250) each chunk of a plurality of chunks of the database according to a plurality of categories of the plurality of items, each chunk including a subset of the plurality of items having a respective category of the plurality of categories. In one or more embodiments, the online system 140 extracts (e.g., via the clustering module 250 or the interface module 270), from the information about the plurality of items, a category (e.g., taxonomy node) of each item of the plurality of items. In such cases, the online system 140 may label (e.g., via the clustering module 250), based at least in part on the extracted category of each item, each entry of the plurality of entries with a corresponding chunk identifier of a plurality of chunk identifiers, each of the plurality of chunk identifiers identifying a respective chunk of the plurality of chunks of the database.

The online system 140 may retrieve (e.g., via the clustering module 250 or the interface module 270), from the database, replacement data for each item of the plurality of items including information about a set of items selected over time by a collection of users of the online system 140 for replacing in a plurality of orders each item of the plurality of items. The online system 140 may label (e.g., via the clustering module 250), further based on the replacement data, each entry of the plurality of entries with the corresponding chunk identifier. The online system 140 may extract (e.g., via the clustering module 250 or the interface module 270), from the information about the plurality of items, a brand identifier for each item of the plurality of items. The online system 140 may label (e.g., via the clustering module 250), further based on the brand identifier, each entry of the plurality of entries with the corresponding chunk identifier.

The online system 140 accesses 415 (e.g., via the clustering module 250) a clustering machine-learning model of the online system 140, wherein the clustering machine-learning model is trained to identify a likelihood that both items of a pair of items are a same core item (e.g., same product) having one or more different attributes (e.g., size, quantity, and/or form factor) and belong to a same cluster of items that identifies the same core item. The online system 140 applies 420 (e.g., via the clustering module 250), for a plurality of pairs of items in that chunk of the database, the clustering machine-learning model to metadata for each pair of items of the plurality of pairs and category data for each pair of items of the plurality of pairs to generate a clustering score for each pair of items of the plurality of pairs that indicates the likelihood that both items in each pair of items of the plurality of pairs belong to a cluster of items that identifies a core item. The online system 140 may retrieve (e.g., via the clustering module 250 or the interface module 270), from a pair of entries of the plurality of entries of the database associated with each pair of items, the category data including information about categories (e.g., taxonomy nodes) for each pair of items and the metadata including image data for each pair of items.

The online system 140 compares 425 (e.g., via the clustering module 250) the clustering score for each pair of items to a threshold score. Responsive to one or more clustering scores for one or more pairs of items of the plurality of pairs being above the threshold score, the online system 140 clusters 430 (e.g., via the clustering module 250) the one or more pairs of items to generate one or more clusters of items. The online system 140 stores 435 (e.g., via the interface module 270), in one or more pairs of entries of the plurality of entries associated with the one or more pairs of items, one or more identifications of the one or more clusters of items to which the one or more pairs of items belong.

The online system 140 identifies 440 (e.g., via the clustering module 250), using the one or more stored identifications, an item in the database and one or more other items in the database that belong to an identical cluster of items of the one or more clusters identifying an identical core item. The online system 140 generates 445 (e.g., via the content presentation module 210) a user interface signal including an indication that the item and the one or more other items are the identical core item. The online system 140 sends 450 (e.g., via the content presentation module 210), via a network (e.g., the network 130), the user interface signal to a device associated with a user of the online system 140 (e.g., the user client device 100), wherein the sending causes a user interface of the device to display the indication that the item and the one or more other items are the identical core item. The online system 140 may send (e.g., via the content presentation module 210) the user interface signal to the device associated with the user, wherein the sending causes the user interface to display a drop-down menu of different attributes of the identical core item when one of the item and the one or more items is shown in the user interface.

The online system 140 may generate (e.g., via the prompt generation module 260) a prompt for input into a LLM (e.g., LLM of the model serving system 150), the prompt including information about each item from a cluster of items of the one or more items, metadata for each item from the cluster of items and a request for generating a response including a list of attributes in a structured form for each item from the cluster of items. The online system 140 may request (e.g., via the prompt generation module 260) the LLM to generate, based on the prompt input into the LLM, the response including the list of attributes in the structured form for each item from the cluster of items. The online system 140 may store (e.g., via the interface module 270), in a corresponding entry of the plurality of entries of the database that is associated with each item from the cluster of items, the list of attributes in the structured form.

The online system 140 may receive (e.g., at the interface module 270), via the network from a device of a source associated with the online system 140 (e.g., the source computing system 120), a signal indicative of a new item having a new list of attributes, the signal including descriptive information for the new item and metadata for the new item. The online system 140 may identify (e.g., via the clustering module 250), using at least one of the descriptive information for the new item or the metadata for the new item, that the new item is the core item identified by the cluster of items. Responsive to identifying that the new item belongs to the cluster of items, the online system 140 may generate (e.g., via the prompt generation module 260) a second prompt for input into the LLM, the second prompt including the descriptive information for the new item, the metadata for the new item, and a request for generating a second response including the new list of attributes in the structured form. The online system 140 may request (e.g., via the prompt generation module 260) the LLM to generate, based on the second prompt input into the LLM, the second response including the new list of attributes in the structured form. The online system 140 may store (e.g., via the interface module 270), in a new entry of the database associated with the new item, the new list of attributes in the structured form, the descriptive information for the new item, the metadata for the new item, and the indication of the cluster.

The online system 140 may generate (e.g., via the machine-learning training module 230) training data by labeling a subset of the plurality of items with an indication that each item from the subset of items represents a respective core item identified by a respective cluster of items. The online system 140 may train (e.g., via the machine-learning training module 230), using the training data, the clustering machine-learning model to generate a set of initial values for a set of parameters of the clustering machine-learning model.

The online system 140 may receive (e.g., at the interface module 270), via a network (e.g., the network 130) from a device associated with a user of the online system 140 (e.g., the user client device 100), a search query entered by the user via a user interface of the device, the search query including information about a requested item. Responsive to the search query and based on the information about the requested item, the online system 140 may identify (e.g., via the clustering module 250) that the requested item belongs to a specific cluster of items of the one or more clusters. Responsive to identifying that the requested item belongs to the specific cluster of items, the online system 140 may retrieve (e.g., via the clustering module 250 or the interface module 270), from each entry of a subset of the plurality of entries having an indication of the specific cluster of items, the list of attributes for each item from the specific cluster of items and descriptive information for each item from the specific cluster of items. The online system 140 may generate (e.g., via the interface module 270), using the list of attributes and the descriptive information for each item from the specific cluster of items, a second user interface signal. The online system 140 may send (e.g., via the interface module 270), via the network, the second user interface signal to the device, wherein the sending causes the device to display the user interface with results to the search query including the list of attributes and the descriptive information for each item from the specific cluster of items.

The online system 140 may receive (e.g., at the interface module 270), via the network from the device associated with the user, a signal indicative of an interaction by the user via a user interface of the device with a user interface element associated with a requested item. Responsive to the received signal and based on information about the requested item, the online system 140 may identify (e.g., via the clustering module 250) that the requested item belongs to the specific cluster of items. Responsive to identifying that the requested item belongs to the specific cluster of items, the online system 140 may retrieve (e.g., via the clustering module 250 or the interface module 270) from each entry of a subset of the plurality of entries having the indication of the specific cluster of items, the list of attributes for each item from the cluster of items and descriptive information for each item from the specific cluster of items. The online system 140 may generate (e.g., via the interface module 270), using the list of attributes and the descriptive information for each item from the specific cluster of items, a second user interface signal. The online system 140 may send (e.g., via the interface module 270), via the network, the second user interface signal to the device, wherein the sending causes the device to display the user interface with a page including the list of attributes and the descriptive information for each item from the specific cluster of items.

The online system 140 may receive (e.g., via the machine-learning training module 230), from the device associated with the user and via the network, feedback data with information provided by the user via the user interface about whether one or more items displayed on the page represent an identical item identified by the specific cluster of items. The online system 140 may re-train the clustering machine-learning model by updating (e.g., via the machine-learning training module 230), using the feedback data, the set of parameters of the clustering machine-learning model.

The online system 140 may receive (e.g., at the interface module 270), via the network from a device of a source (e.g., the source computing system 120) associated with the online system 140, a signal indicative of a requested item previously converted by a user of the online system 140 being unavailable. Responsive to the received signal and based on information about the requested item, the online system 140 may identify (e.g., via the clustering module 250) that the item belongs to the specific cluster of items. Responsive to identifying that the requested item belongs to the specific cluster of items, the online system 140 may retrieve (e.g., via the clustering module 250 or the interface module 270) from one or more entries of a subset of the plurality of entries having the indication of the cluster of items, the list of attributes for one or more items from the specific cluster of items and descriptive information for the one or more items. The online system 140 may generate (e.g., via the interface module 270), using the list of attributes and the descriptive information for the one or more items, a second user interface signal. The online system 140 may send (e.g., via the interface module 270), via the network, the second user interface signal to the device, wherein the sending causes the device to display the user interface with a page including the list of attributes and the descriptive information for the one or more items that represent replacement for the requested item that is unavailable.

The online system 140 may receive (e.g., at the interface module 270), via the network from a device of an entity associated with the online system 140 (e.g., CPG entity), a signal indicative of a selection of a promotional core item for a promotion. Responsive to the received signal and based on the selection of the promotional core item, the online system 140 may identify (e.g., via the clustering module 250) a specific cluster of items of the one or more clusters that identifies the promotional core item. Responsive to identifying the specific cluster of items, the online system 140 may retrieve (e.g., via the clustering module 250 or the interface module 270) from each entry of a subset of the plurality of entries having an indication of the specific cluster of items, the list of attributes for each item from the specific cluster of items and descriptive information for each item from the specific cluster of items. The online system 140 may generate (e.g., via the interface module 270), using the list of attributes and the descriptive information for each item from the specific cluster of items, a second user interface signal. The online system 140 may send (e.g., via the interface module 270), via the network, the second user interface signal to a collection of devices associated with a collection of users of the online system 140 (e.g., user client devices 100), wherein the sending causes the collection of devices to display user interfaces with information about the promotional core item including the list of attributes and the descriptive information for each item from the specific cluster of items.

Embodiments of the present disclosure are directed to the online system 140 that uses a trained machine-learning model to group items in an item database so that items in each group belong to a same corresponding core item (or product) but have different attributes (e.g., size, form factor, and/or quantity). The online system 140 also prompts an LLM to output key varying attributes (e.g., size, form factor, and/or quantity) for each group of items in a structured format, which is then stored in the item database and used for different applications.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:
    accessing a database of an online system, the database including a plurality of entries that store information about a plurality of items, each entry of the plurality of entries storing information about a respective item of the plurality of items;
    extracting each chunk of a plurality of chunks of the database according to a plurality of categories of the plurality of items, each chunk including a subset of the plurality of items having a respective category of the plurality of categories;
    accessing a clustering machine-learning model of the online system, wherein the clustering machine-learning model is trained to identify a likelihood that both items of a pair of items are a same core item having one or more different attributes and belong to a same cluster of items that identifies the same core item;
    applying, for a plurality of pairs of items in that chunk of the database, the clustering machine-learning model to metadata for each pair of items of the plurality of pairs and category data for each pair of items of the plurality of pairs to generate a clustering score for each pair of items of the plurality of pairs that indicates the likelihood that both items in each pair of items of the plurality of pairs belong to a cluster of items that identifies a core item;
    comparing the clustering score for each pair of items to a threshold score;
    responsive to one or more clustering scores for one or more pairs of items of the plurality of pairs being above the threshold score, clustering the one or more pairs of items to generate one or more clusters of items;
    storing, in one or more pairs of entries of the plurality of entries associated with the one or more pairs of items, one or more identifications of the one or more clusters of items to which the one or more pairs of items belong;

identifying, using the one or more stored identifications, an item in the database and one or more other items in the database that belong to an identical cluster of items of the one or more clusters identifying an identical core item;

generating a user interface signal including an indication that the item and the one or more other items are the identical core item; and sending, via a network, the user interface signal to a device associated with a user of the online system, wherein the sending causes a user interface of the device to display the indication that the item and the one or more other items are the identical core item.

2. The method of claim 1, wherein extracting each chunk comprises:

extracting, from the information about the plurality of items, a category of each item of the plurality of items; and labeling, based at least in part on the extracted category of each item, each entry of the plurality of entries with a corresponding chunk identifier of a plurality of chunk identifiers, each of the plurality of chunk identifiers identifying a respective chunk of the plurality of chunks of the database.

3. The method of claim 2, wherein extracting each chunk further comprises:

retrieving, from the database, replacement data for each item of the plurality of items including information about a set of items selected over time by a collection of users of the online system for replacing in a plurality of orders each item of the plurality of items; and labeling, further based on the replacement data, each entry of the plurality of entries with the corresponding chunk identifier.

4. The method of claim 2, wherein extracting each chunk further comprises:

extracting, from the information about the plurality of items, a brand identifier for each item of the plurality of items; and labeling, further based on the brand identifier, each entry of the plurality of entries with the corresponding chunk identifier.

5. The method of claim 1, further comprising:

retrieving, from a pair of entries of the plurality of entries of the database associated with each pair of items, the category data including information about categories for each pair of items and the metadata including image data for each pair of items.

6. The method of claim 1, further comprising:

generating a prompt for input into a large language model (LLM), the prompt including information about each item from a cluster of items of the one or more clusters, metadata for each item from the cluster of items and a request for generating a response including a list of attributes in a structured form for each item from the cluster of items;

requesting the LLM to generate, based on the prompt input into the LLM, the response including the list of attributes in the structured form for each item from the cluster of items; and storing, in a corresponding entry of the plurality of entries of the database that is associated with each item from the cluster of items, the list of attributes in the structured form.

7. The method of claim 6, further comprising:

receiving, via the network from a device of a source associated with the online system, a signal indicative of a new item having a new list of attributes, the signal including descriptive information for the new item and metadata for the new item;

identifying, using at least one of the descriptive information for the new item or the metadata for the new item, that the new item is the core item identified by the cluster of items;

responsive to identifying that the new item belongs to the cluster of items, generating a second prompt for input into the LLM, the second prompt including the descriptive information for the new item, the metadata for the new item, and a request for generating a second response including the new list of attributes in the structured form;

requesting the LLM to generate, based on the second prompt input into the LLM, the second response including the new list of attributes in the structured form; and storing, in a new entry of the database associated with the new item, the new list of attributes in the structured form, the descriptive information for the new item, the metadata for the new item, and the indication of the cluster of items.

8. The method of claim 1, further comprising:

generating training data by labeling a subset of the plurality of items with an indication that each item from the subset of items represents a respective core item identified by a respective cluster of items; and training, using the training data, the clustering machine-learning model to generate a set of initial values for a set of parameters of the clustering machine-learning model.

9. The method of claim 1, wherein sending the user interface signal comprises:

sending the user interface signal to the device associated with the user, wherein the sending causes the user interface to display a drop-down menu of different attributes of the identical core item when one of the item and the one or more other items is shown in the user interface.

10. The method of claim 1, further comprising:

receiving, via the network from the device associated with the user, a search query entered by the user via the user interface of the device, the search query including information about a requested item;

responsive to the search query and based on the information about the requested item, identifying that the requested item belongs to a specific cluster of items of the one or more clusters;

responsive to identifying that the requested item belongs to the specific cluster of items, retrieving from each entry of a subset of the plurality of entries having an indication of the specific cluster of items, a list of attributes for each item from the specific cluster of items and descriptive information for each item from the specific cluster of items;

generating, using the list of attributes and the descriptive information for each item from the specific cluster of items, a second user interface signal; and sending, via the network, the second user interface signal to the device, wherein the sending causes the device to display the user interface with results to the search query including the list of attributes and the descriptive information for each item from the specific cluster of items.

11. The method of claim 1, further comprising:
receiving, via the network from the device associated with the user, a signal indicative of an interaction by the user via the user interface of the device with a user interface element associated with a requested item;
responsive to the received signal and based on information about the requested item, identifying that the requested item belongs to a specific cluster of items of the one or more clusters;
responsive to identifying that the requested item belongs to the specific cluster of items, retrieving from each entry of a subset of the plurality of entries having an indication of the specific cluster of items, a list of attributes for each item from the specific cluster of items and descriptive information for each item from the specific cluster of items;
generating, using the list of attributes and the descriptive information for each item from the specific cluster of items, a second user interface signal; and
sending, via the network, the second user interface signal to the device, wherein the sending causes the device to display the user interface with a page including the list of attributes and the descriptive information for each item from the specific cluster of items.

12. The method of claim 11, further comprising:
receiving, from the device associated with the user and via the network, feedback data with information provided by the user via the user interface about whether one or more items displayed on the page represent an identical core item identified by the specific cluster of items; and
re-training the clustering machine-learning model by updating, using the feedback data, a set of parameters of the clustering machine-learning model.

13. The method of claim 1, further comprising:
receiving, via the network from a device of a source associated with the online system, a signal indicative of a requested item previously converted by the user being unavailable;
responsive to the received signal and based on information about the requested item, identifying that the requested item belongs to a specific cluster of items of the one or more clusters;
responsive to identifying that the requested item belongs to the specific cluster of items, retrieving from one or more entries of a subset of the plurality of entries having an indication of the specific cluster of items, a list of attributes for at least one item from the specific cluster of items and descriptive information for the one or more other items;
generating, using the list of attributes and the descriptive information for the at least one item, a second user interface signal; and
sending, via the network, the second user interface signal to the device associated with the user, wherein the sending causes the device associated with the user to display the user interface with a page including the list of attributes and the descriptive information for the at least one item that represents replacement for the item that is unavailable.

14. The method of claim 1, further comprising:
receiving, via the network from a device of an entity associated with the online system, a signal indicative of a selection of a promotional core item for a promotion;
responsive to the received signal and based on the selection of the promotional core item, identifying a specific cluster of items of the one or more clusters that identifies the promotional core item;
responsive to identifying the specific cluster of items, retrieving from each entry of a subset of the plurality of entries having an indication of the specific cluster of items, a list of attributes for each item from the specific cluster of items and descriptive information for each item from the specific cluster of items;
generating, using the list of attributes and the descriptive information for each item from the specific cluster of items, a second user interface signal; and
sending, via the network, the second user interface signal to a collection of devices associated with a collection of users of the online system, wherein the sending causes the collection of devices to display user interfaces with information about the promotional core item including the list of attributes and the descriptive information for each item from the specific cluster of items.

15. A computer program product comprising a non-transitory computer readable storage medium having instructions encoded thereon that, when executed by a processor, cause the processor to perform steps comprising:
accessing a database of an online system, the database including a plurality of entries that store information about a plurality of items, each entry of the plurality of entries storing information about a respective item of the plurality of items;
extracting each chunk of a plurality of chunks of the database according to a plurality of categories of the plurality of items, each chunk including a subset of the plurality of items having a respective category of the plurality of categories;
accessing a clustering machine-learning model of the online system, wherein the clustering machine-learning model is trained to identify a likelihood that both items of a pair of items are a same core item having one or more different attributes and belong to a same cluster of items that identifies the same core item;
applying, for a plurality of pairs of items in that chunk of the database, the clustering machine-learning model to metadata for each pair of items of the plurality of pairs and category data for each pair of items of the plurality of pairs to generate a clustering score for each pair of items of the plurality of pairs that indicates the likelihood that both items in each pair of items of the plurality of pairs belong to a cluster of items that identifies a core item;
comparing the clustering score for each pair of items to a threshold score;
responsive to one or more clustering scores for one or more pairs of items of the plurality of pairs being above the threshold score, clustering the one or more pairs of items to generate one or more clusters of items;
storing, in one or more pairs of entries of the plurality of entries associated with the one or more pairs of items, one or more identifications of the one or more clusters of items to which the one or more pairs of items belong;
identifying, using the one or more stored identifications, an item in the database and one or more other items in the database that belong to a same cluster of items of the one or more clusters identifying an identical core item;
generating a user interface signal including an indication that the item and the one or more other items are the identical core item; and
sending, via a network, the user interface signal to a device associated with a user of the online system, wherein the sending causes a user interface of the device to display the indication that the item and the one or more other items are the identical core item.

16. The computer program product of claim 15, wherein the instructions further cause the processor to perform steps comprising:
   extracting, from the information about the plurality of items, a category of each item of the plurality of items; and
   extracting each chunk by labeling, based at least in part on the extracted category of each item, each entry of the plurality of entries with a corresponding chunk identifier of a plurality of chunk identifiers, each of the plurality of chunk identifiers identifying a respective chunk of the plurality of chunks of the database.

17. The computer program product of claim 15, wherein the instructions further cause the processor to perform steps comprising:
   generating a prompt for input into a large language model (LLM), the prompt including information about each item from a cluster of items of the one or more clusters, metadata for each item from the cluster of items and a request for generating a response including a list of attributes in a structured form for each item from the cluster of items;
   requesting the LLM to generate, based on the prompt input into the LLM, the response including the list of attributes in the structured form for each item from the cluster of items; and
   storing, in a corresponding entry of the plurality of entries of the database that is associated with each item from the cluster of items, the list of attributes in the structured form.

18. The computer program product of claim 15, wherein the instructions further cause the processor to perform steps comprising:
   generating training data by labeling a subset of the plurality of items with an indication that each item from the subset of items represents a respective core item identified by a respective cluster of items; and
   training, using the training data, the clustering machine-learning model to generate a set of initial values for a set of parameters of the clustering machine-learning model.

19. The computer program product of claim 15, wherein the instructions further cause the processor to perform steps comprising:
   sending the user interface signal to the device associated with the user, wherein the sending causes the user interface to display a drop-down menu of different attributes of the identical core item when one of the item and the one or more other items is shown in the user interface.

20. A computer system comprising:
a processor; and
a non-transitory computer-readable storage medium having instructions that, when executed by the processor, cause the computer system to perform steps comprising:
   accessing a database of an online system, the database including a plurality of entries that store information about a plurality of items, each entry of the plurality of entries storing information about a respective item of the plurality of items;
   extracting each chunk of a plurality of chunks of the database according to a plurality of categories of the plurality of items, each chunk including a subset of the plurality of items having a respective category of the plurality of categories;
   accessing a clustering machine-learning model of the online system, wherein the clustering machine-learning model is trained to identify a likelihood that both items of a pair of items are a same core item having one or more different attributes and belong to a same cluster of items that identifies the same core item;
   applying, for a plurality of pairs of items in that chunk of the database, the clustering machine-learning model to metadata for each pair of items of the plurality of pairs and category data for each pair of items of the plurality of pairs to generate a clustering score for each pair of items of the plurality of pairs that indicates the likelihood that both items in each pair of items of the plurality of pairs belong to a cluster of items that identifies a core item;
   comparing the clustering score for each pair of items to a threshold score;
   responsive to one or more clustering scores for one or more pairs of items of the plurality of pairs being above the threshold score, clustering the one or more pairs of items to generate one or more clusters of items;
   storing, in one or more pairs of entries of the plurality of entries associated with the one or more pairs of items, one or more identifications of the one or more clusters of items to which the one or more pairs of items belong;
   identifying, using the one or more stored identifications, an item in the database and one or more other items in the database that belong to a same cluster of items of the one or more clusters identifying an identical core item;
   generating a user interface signal including an indication that the item and the one or more other items are the identical core item; and
   sending, via a network, the user interface signal to a device associated with a user of the online system, wherein the sending causes a user interface of the device to display the indication that the item and the one or more other items are the identical core item.

* * * * *